US007672976B2

(12) United States Patent
Tobin et al.

(10) Patent No.: US 7,672,976 B2
(45) Date of Patent: *Mar. 2, 2010

(54) METHOD FOR THE REDUCTION OF IMAGE CONTENT REDUNDANCY IN LARGE IMAGE DATABASES

(75) Inventors: Kenneth William Tobin, Harriman, TN (US); Thomas P. Karnowski, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 273 days.

This patent is subject to a terminal disclaimer.

(21) Appl. No.: 11/416,844

(22) Filed: May 3, 2006

(65) Prior Publication Data

US 2007/0260639 A1  Nov. 8, 2007

(51) Int. Cl.
  *G06F 17/30* (2006.01)
(52) U.S. Cl. .................... 707/104.1; 707/3; 707/6; 707/200; 707/205
(58) Field of Classification Search ............ None
  See application file for complete search history.

(56) References Cited

U.S. PATENT DOCUMENTS

| | | | | |
|---|---|---|---|---|
| 5,353,119 | A * | 10/1994 | Dorricott et al. | 348/446 |
| 5,915,250 | A * | 6/1999 | Jain et al. | 707/100 |
| 5,933,823 | A * | 8/1999 | Cullen et al. | 707/6 |
| 5,982,920 | A * | 11/1999 | Tobin et al. | 382/145 |
| 6,205,243 | B1 * | 3/2001 | Migdal et al. | 382/154 |
| 6,240,423 | B1 * | 5/2001 | Hirata | 707/104.1 |
| 6,535,776 | B1 | 3/2003 | Tobin, Jr. et al. | |
| 6,751,343 | B1 | 6/2004 | Ferrell et al. | |
| 6,993,180 | B2 * | 1/2006 | Sun et al. | 707/104.1 |
| 7,050,620 | B2 * | 5/2006 | Heckman | 382/133 |
| 7,072,493 | B2 * | 7/2006 | Venkatesan et al. | 382/100 |
| 7,218,772 | B2 * | 5/2007 | Gleason et al. | 382/149 |
| 7,356,430 | B2 * | 4/2008 | Miguelanez et al. | 702/108 |
| 7,369,696 | B2 * | 5/2008 | Arini et al. | 382/133 |
| 2003/0031260 | A1 * | 2/2003 | Tabatabai et al. | 375/240.25 |
| 2003/0099330 | A1 * | 5/2003 | Mery et al. | 378/210 |
| 2003/0228051 | A1 * | 12/2003 | Gleason et al. | 382/149 |
| 2004/0170330 | A1 * | 9/2004 | Fogg | 382/232 |
| 2004/0221237 | A1 * | 11/2004 | Foote et al. | 715/716 |

(Continued)

FOREIGN PATENT DOCUMENTS

WO    WO 01/22270 A2 *   3/2001

(Continued)

OTHER PUBLICATIONS

Lu et al., "Digital photo similarity analysis in frequency domain and photo album compression", MUM'04 : Proceedings of the 3rd international conference on Mobile and ubiquitous multimedia, Oct. 2004, ACM Press, p. 237-244.*

(Continued)

*Primary Examiner*—Khanh B Pham
(74) *Attorney, Agent, or Firm*—Novak Druce + Quigg; Gregory A. Nelson; Gregory M. Lefkowitz

(57) ABSTRACT

A method of increasing information content for content-based image retrieval (CBIR) systems includes the steps of providing a CBIR database, the database having an index for a plurality of stored digital images using a plurality of feature vectors, the feature vectors corresponding to distinct descriptive characteristics of the images. A visual similarity parameter value is calculated based on a degree of visual similarity between features vectors of an incoming image being considered for entry into the database and feature vectors associated with a most similar of the stored images. Based on said visual similarity parameter value it is determined whether to store or how long to store the feature vectors associated with the incoming image in the database.

17 Claims, 3 Drawing Sheets

U.S. PATENT DOCUMENTS

| | | | |
|---|---|---|---|
| 2005/0193269 A1* | 9/2005 | Haswell et al. | 714/38 |
| 2005/0207633 A1* | 9/2005 | Arini et al. | 382/133 |
| 2006/0004698 A1* | 1/2006 | Pyhalammi et al. | 707/2 |
| 2006/0120618 A1* | 6/2006 | Mizoguchi | 382/255 |
| 2007/0036434 A1* | 2/2007 | Saveliev | 382/173 |
| 2007/0061393 A1* | 3/2007 | Moore | 709/201 |
| 2007/0217626 A1* | 9/2007 | Sharma et al. | 381/100 |
| 2007/0258630 A1* | 11/2007 | Tobin et al. | 382/128 |

FOREIGN PATENT DOCUMENTS

WO     WO 2006118310 A1 * 11/2006

OTHER PUBLICATIONS

Ravela et al., "Multi-modal retrieval of trademark images using global similarity", Technical Report #ADA440302, Jan. 1, 2005, Massachusetts Univ. Amherst Center for Intelligent Information Retrieval, <Retrieved from DTIC Mar. 26, 2008>, p. 1-18.*

Felipe et al., "A New Similarity Measure for Histograms Applied to Content-based Retrieval of Medical Images", SAC'06, Apr. 23, 2006, ACM Press, p. 258-259.*

Neumann et al., "Image Retrieval and Perceptual Similarity", ACM Transactions on Applied Perception, Jan. 2006, ACM Press, p. 31-47.*

Ravela et al., "On computing global similarity in images", Technical Report #ADA349477, Jan. 1998, Massachusetts Univ. Amherst Dept of Computer Science and Information Science, <Retrieved from DTIC Mar. 26, 2008>, p. 1-6.*

Khalid et al., "Kullback-Leiber Divergence Measure in Correlation of Gray-Scale Objects", Second International Conference on Innovations in Information Technology IIT'05, Sep. 2005, hereinafter Khalid.*

Rorvig et al, "Content-Based Image Retrieval by Integration of Metadata Encoded Image and Text Features", May 7, 2002, WWW2002, p. 1-2, <Retrieved from the internet Jan. 26, 2009>.*

Swain et al, "WebSeer: An Image Search Engine for the World Wide Web", Jun. 1997, Computer Vision and Pattern Recognition 1997, p. 1-8, <Retrieved from internet Jan. 26, 2009>.*

Llados et al, "Symbol Recognition by Error-Tolerant Subgraph Matching between Region Adjacency Graphs", Oct. 2001, IEEE Transactions on Pattern Analysis and Machine Intelligence, vol. 23, No. 10, p. 1137-1143, <Retrieved from IEEE Explore Jan. 26, 2009>.*

Khalil et al, "A Dyadic Wavelet Affine Invariant Function for 2D Shape Recognition", Oct. 2001, IEEE Transactions on Pattern Analysis and Machine Intelligence, vol. 23, No. 10, p. 1152-1164, <Retrieved from IEEE Explore Jan. 26, 2009>.*

Tobin et al, "Content based image retrieval in the industrial environment", Feb. 2002, Eurasip, Journal of Applied Signal Processing 2002, p. 704-713, <Retrieved from internet Jul. 2, 2009>.*

Tobin et al, "Large-Scale Geospatial Indexing for Image-Based Retrieval and Analysis", Nov. 2005, 10 pages, <Retrieved from SpringerLink Jul. 2, 2009>.*

Tobin et al, "Image based informatics for preclinical biomed research LNCS 4292", Nov. 2006, ISVC 2006, LNCS 824-834, <Retrieved from internet Jul. 2, 2009>.*

Tobin et al, "Automated feature generation in large-scale geospatial libraries for content-based indexing", Feb. 2006, ORNL, 28 pages, <Retrieved from ORNL Jul. 2, 2009>.*

Becanovic et al, "Image object classification using saccadic search spatio-temporal pattern encoding and self-organization", Mar. 2000, Pattern Recognition Letters, 11 pages, <Retrieved from FBI and Pattern Recognition Letters>.*

Becanovic et al, "Feature extraction from photographical images using a hybrid neural network", Dec. 1999, CiteSeer, <Retrieved from internet Jul. 2, 2009>.*

Tobin, Curriculum Vitae, Aug. 2007, <Retrieved from www.archive. org with snapshot dated Aug. 2007>.*

Williams et al, "Clinical evaluation of an international static image-based telepathology service", Dec. 2001, Human Pathology, vol. 32, No. 12, p. 1309-1317, <Retrieved from internet Jul. 2, 2009>.*

Tobin et al, "Integrated Applications of Inspection Data in the Semiconductor Manufacturing Environment", Dec. 2001, SPIE, ORNL, 10 pages, <Reitreved from internet Jul. 2, 2009>.*

Tobin et al, "Image Retrieval in the Industrial Environment", Jan. 1999, SPIE, ORNL, 9 pages, <Retrieved from internet Jul. 2, 2009>.*

Tobin et al, "Content-Based Image Retrieval for Semiconductor Process Characterization", Feb. 2002, EURASIP, Journal on Applied Signal Processing vol. 2002, Issue 7, Hindawi Publishing Corp., p. 704-713, <Retrieved from internet Jul. 2, 2009>.*

Karnowski, "Field-test results of an image retrieval system for semiconductor yield learning", Dec. 2001, Learning SPIE, 12 pages, <Retrieved from internet Jul. 2, 2009>.*

Tobin et al, "Automatic classification of spatial signatures on semiconductor wafer maps", Mar. 1997, OSTI.gov, <Retrieved Jul. 2, 2009>.*

Tobin et al, "Automated analysis for rapid defect sourcing and yield learning", Dec. 1997, Future Fab Intl, vol. 4, 15 pages, <Retrieved from internet Jul. 2, 2009>.*

EPO, PCT US 00/40959 Intl. Search Report, Oct. 13, 2003.*

Tobin et al, "The use of historical defect imagery for yield learning", Sep. 12, 2000, IEEE ASM Conf., p. 18-25, <Retrieved IEEE Explore Jul. 2, 2009>.*

Garber, "Basic Concepts of Information Theory", 2008, Working Educational Notebook, p. 1-5, <Retrieved from internet Jul. 2, 2009>.*

Mattiassen, "Similarity Measure Using Kullback-Leibler Divergence Between Gamma Distributions", Jan. 2002, LNCS, Springer, <Retrieved from Springer Link Jul. 3, 2009>.*

Tobin et al. "Automated Feature Gerneration in Large-Scale Geospatial Libraries for Content-Based Indexing", Photogrammetric Engineering & Remote Sensing, vol. 72, No. 5, May 2006, pp. 1-10.

Smeulders et al. "Content-Based Image Retrieval at the End of the Early Years", IEEE Transactions on Pattern Analysis and Machine Intelligence, vol. 22, No. 12, Dec. 2000, pp. 1349-1379.

Bingham et al. "Semiconductor sidewall shape estimation", Journal of Electronic Imaging, vol. 13, No. 3, Jul. 2004, pp. 474-485.

Tobin et al. "Content-Based Image Retrieval for Semiconductor Process Characterization", EURASIP Journal on Applied Signal Processing, Special Issue on Applied Visual Inspection, vol. 2002, No. 7, 2002, pp. 1-11.

* cited by examiner

METHOD FOR THE REDUCTION OF IMAGE CONTENT REDUNDANCY IN LARGE IMAGE DATABASES

STATEMENT REGARDING FEDERALLY SPONSORED RESEARCH OR DEVELOPMENT

This invention was made with government support under contract DE AC05 96OR22464, awarded by the United States Department of Energy. The United States government has certain rights in this invention.

CROSS-REFERENCE TO RELATED APPLICATIONS

N/A

FIELD OF THE INVENTION

The invention relates to the field of content-based image retrieval (CBIR) and more particularly to a method and apparatus for identifying and reducing redundancy in the CBIR image database.

BACKGROUND

The ability to manage large image databases has been a topic of growing research. Imagery is being generated and maintained for a large variety of applications including remote sensing, architectural and engineering design, geographic information systems, weather forecasting, and biomedical image management. Content-based image retrieval (CBIR) is a technology that is being developed to address these application areas. CBIR refers to techniques used to index and retrieve images from databases based on their pictorial content. Pictorial content is typically defined by a set of numerical features extracted from an image that describe the color, texture and/or shape of the entire image or of specific objects. This numerical feature description is used in CBIR to index a database through various techniques, including distance-based, rule-based decision-making, and fuzzy inferencing.

With the availability of low-cost, high-performance computers, memory, and disk storage media, image libraries and CBIR technologies have become more common. Although large repositories can be readily assembled, the efficiency of these systems to retrieve the most relevant imagery is still primarily a function of capacity and long-term storage.

Applied to the semiconductor industry, image data management in the manufacturing environment is becoming more problematic as the size of silicon wafers continues to increase while the dimension of critical features continues to shrink. Fabricators rely on a growing host of image-generating inspection tools to monitor tiny defects and other features of interest in complex device manufacturing processes. These inspection tools include optical and laser scattering microscopy, confocal microscopy, scanning electron microscopy, and atomic force microscopy. The number of images that are generated are on the order of 20,000 to 30,000 each week in some fabrication facilities. Manufacturers currently maintain on the order of 500,000 images in their data management systems (DMS) for extended periods of time. Gleaning the historical value from these large image repositories for yield improvement is difficult to accomplish using the standard database methods currently associated with these data sets (e.g., performing queries based on time and date, lot numbers, wafer identification numbers, etc.). CBIR techniques facilitate an indexing and reuse of this data based on image content.

Another image-rich environment where data management needs are growing is in the preclinical and clinical biomedical and medical communities. Preclinical imagery is collected from small animal research studies using anatomic and functional modes such as micro-computed x-ray tomography (CT), positron emission tomography (PET), single photon emission computed tomography (SPECT), and magnetic resonance imaging (MRI). In the clinical environment imagery is also generated from X-ray, CT, PET, and SPECT modes plus optical modes such as retinal imaging with fundus cameras and optical coherence tomography (OCT). Many preclinical research and clinical medical facilities today use picture archiving and communications systems (PACS) to store these images. Accessibility, indexing, and reuse are critical to these biologists and medical personnel but access is typically limited today to standard database queries using non-image data.

Another image-rich environment where data management needs are growing is in the preclinical and clinical biomedical and medical communities. Preclinical imagery is generally collected from small animal research studies using anatomic and functional modes, such as micro-computed x-ray tomography (CT), positron emission tomography (PET), single photon emission computed tomography (SPECT), and magnetic resonance imaging (MRI). In the clinical environment imagery is also generated from X-ray, CT, PET, and SPECT modes plus optical modes such as retinal imaging with fundus cameras and optical coherence tomography (OCT). Many preclinical research and clinical medical facilities today use picture archiving and communications systems (PACS) to store these images. Accessibility, indexing, and reuse are critical to these biologists and medical personnel but access is typically limited today to standard database queries using non-image data.

Due to the rapid growth in the size of image libraries and the high potential for data (image) redundancy, a method is needed to reduce redundancy to facilitate either the long-term storage of the most information-rich image content (i.e, maintaining the same database capacity but keeping data for a longer period of time), or (2) a reduction in the size of the repository capacity which results in improved performance (i.e., storage and retrieval efficiency) and reduced time for indexing and retrieval.

SUMMARY OF THE INVENTION

A method of increasing information content for content-based image retrieval (CBIR) systems includes the step of providing a CBIR database, the database comprising an index for a plurality of stored digital images using a plurality of feature vectors. The feature vectors correspond to distinct descriptive characteristics of the images. A visual similarity parameter value is calculated based on a degree of visual similarity between feature vectors of an incoming image being considered for indexing into the database and feature vectors associated with a most similar of the images stored in the associated system. Based on the calculated visual similarity parameter value, it is determined whether to store or how long to store the feature vectors of the incoming image in the database.

The feature vectors extracted from an image becomes the index for that image in the database, typically being a unique identifier for that image. The indices are stored in a table in the CBIR database, usually along with a pointer to the location of the image residing in a storage media (e.g. hard drive).

The visual similarity parameter can be based on a distance, divergence or other information-theoretical comparison. Distances can include Minkowski-form distances, such as Euclidean or L-norm, or Mahalanobis or quadradic form distance. The divergences can include a Kullback-Leiber or Jeffrey divergence.

The method can further comprise the step of defining a threshold value, wherein if the visual similarity parameter value is above the threshold value the feature vectors associated with the incoming image is denied entry into the database (and the image is preferably not stored in the storage medium), and if the similarity parameter value is less than the threshold the feature vectors associated with the incoming image is entered into the database (and the image is preferably stored in the storage medium). A plurality of threshold values can be defined, wherein the plurality of threshold values are used to define ranges of the similarity parameter values which are paired with durations for storage lifetimes in the database for the feature vectors associated with the incoming image.

The images can be in-process manufacturing images or in-process images from an on-going preclinical or clinical study involving a plurality of patients in a biological or medical environment. In one embodiment, the in-process manufacturing images are biological, medical or semiconductor images.

The method can include the step of indexing the plurality of feature vectors derived from the images using an image clustering method to produce a hierarchical search tree for indexing the plurality of feature vectors. In one embodiment, the image clustering method comprises an unsupervised clustering method. The image clustering method preferably maps the feature vectors associated with the plurality of images into a set of groups based on similar image content, with the number of groups numbering less than the number of images. In a preferred embodiment, the database includes stored information describing specific processes or process steps associated with each of the feature vector identifiers which index the stored images.

A content-based image retrieval (CBIR) system comprises a computer apparatus programmed with a routine set of instructions stored in a fixed medium. The computer apparatus comprises structure for extracting a plurality of feature vectors from a digital image. The feature vectors correspond to particular descriptive characteristics of the image. The system includes structure for implementing a clustering method to index the feature vectors in a hierarchical search tree. A storage medium storing a plurality of the digital images is communicably coupled to an image storage manager module, the image storage module for identifying a visual similarity parameter value based on a degree of visual similarity between the features vectors of an incoming digital image being considered for entry into the database and feature vectors of a most similar of the plurality of stored images, and determining whether to store or how long to store the feature vectors associated with the incoming image in the database based on the visual similarity parameter value. The system also includes a structure for retrieving a digital image corresponding to feature vectors stored in the hierarchical search tree, the image having feature vectors comparably related to feature vectors of a query image. The image storage manager module preferably includes at least one stored threshold value, wherein if the visual similarity parameter value is above the threshold value the feature vectors associated with an incoming image is denied entry into the database, and if the similarity parameter is less than the threshold value the feature vectors associated with incoming image is entered into the database. The image clustering provided preferably comprises unsupervised clustering.

BRIEF DESCRIPTION OF THE DRAWINGS

A fuller understanding of the present invention and the features and benefits thereof will be accomplished upon review of the following detailed description together with the accompanying drawings, in which.

DETAILED DESCRIPTION OF THE INVENTION

A method of increasing information content for content-based image retrieval (CBIR) systems comprises the step of providing a CBIR database, the database comprising a plurality of data images each indexed in the database using a plurality of feature vectors. The feature vectors correspond to distinct descriptive characteristics of the images. A visual similarity parameter value is calculated based on a degree of visual similarity between features vectors of an incoming image being considered for entry into the database and feature vectors of a most similar of the plurality of images stored in the associated system. Based on the calculated visual similarity parameter value, it is determined whether to store or how long to store the feature vectors associated with incoming image in the database.

Figure 1:
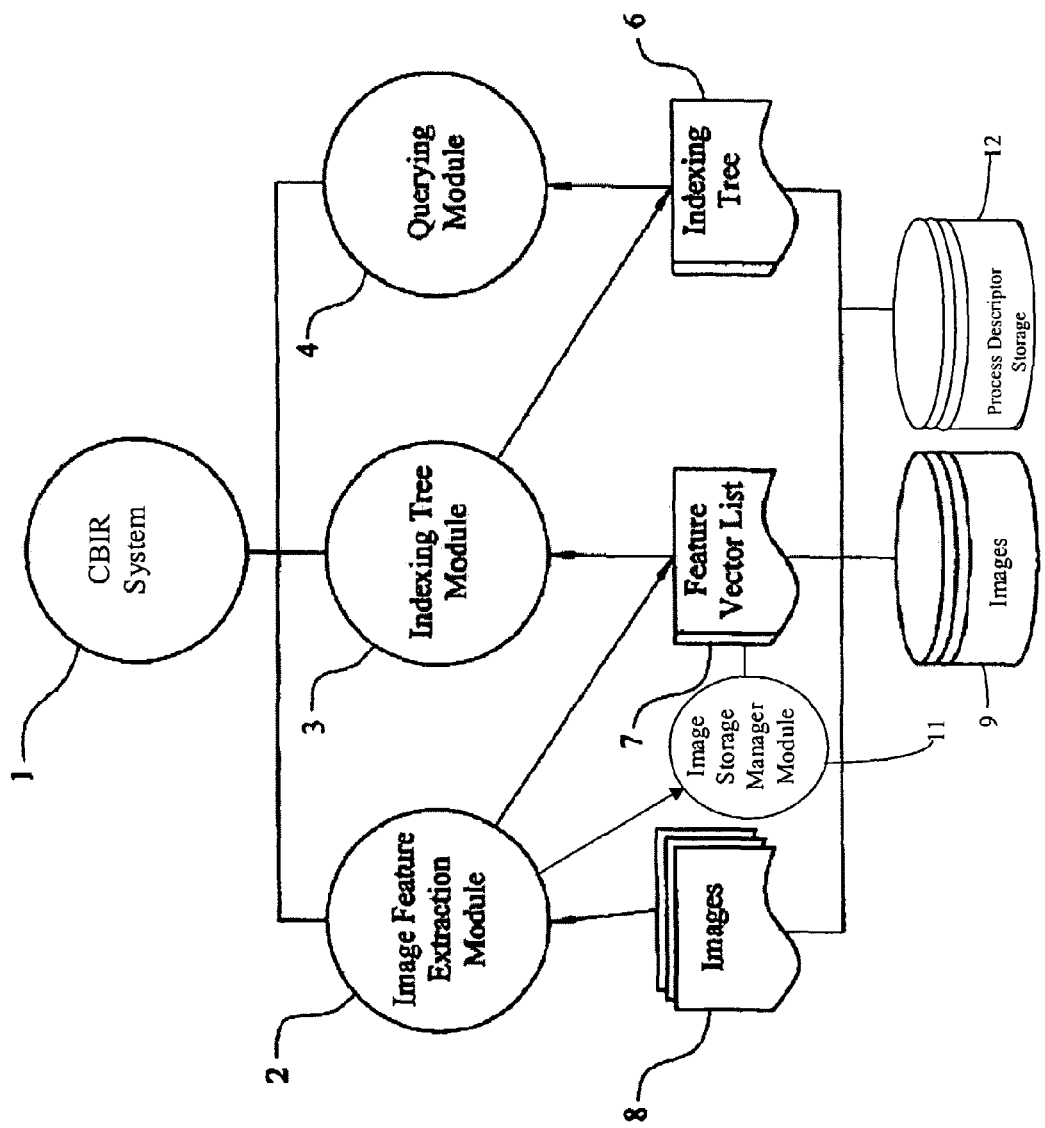
FIG. 1 is a schematic representation of CBIR system having an image storage manager module according to the invention.

FIG. 1 illustrates a CBIR system 1 in accordance with one inventive arrangement having an image storage manager module 11 according to the invention. The CBIR system 1 includes a storage medium 9 (e.g. hard drive) storing a collection of images which are indexed as feature vectors in associated feature vector list 7 which comprises descriptive data corresponding to each stored image. System 1 also preferably includes process descriptor storage 12 for storing information describing specific processes or process steps associated with each of the images. Images can be in-process manufacturing images, such as semiconductor images. An example of semiconductor fabrication process steps that can be stored along with associated image data include metal 1 deposition, and low temperature oxide inter-level dielectric deposition. In a biomedical application the animal study protocol such as study ID, unique animal ID, SPECT tracer, CT contrast agent used, and time of administration can be stored.

System 1 includes four basic modules, an image feature extraction module 2, an indexing tree module 3, a querying module 4, and an image storage manager module 11 according to the invention, with each module performing a different CBIR function. As noted above, the system 1 can contain, in addition to the collection of images and associated feature vectors, other process information that describes a multitude of processed. For example, in semiconductor fabrication the other process information can comprise individual process tools and equipment, and the defect category or type stored in process descriptor storage 12.

First, the image feature extraction module 2 can represent query and database images 8 in terms of a small number of numerical descriptors. Specifically, the image feature extraction module 2 can receive as an input, image 8. The image feature extraction module 2 can survey the image 8 deriving a vector of numerical descriptors corresponding to the image 8. In a preferred embodiment as disclosed in U.S. Pat. No. 6,751,343 to Ferrel et al, unlike prior CBIR systems, the manufacturing imagery can be described in terms of a plurality of independent sets of characteristics, such as image modality and overall characteristics, substrate-background characteristics, and anomaly-defect characteristics. Ferrel et al. is incorporated by reference into the present application in its entirety.

Moreover, the characteristics used to describe the modality, background, and defect are based on the texture, color, and shape of the entire image or of segmented regions of the image. In the preferred embodiment, the image feature extraction module 2 pre-processes every image to generate a series of feature vectors having these descriptive set of features, each vector weighted to a particular characteristic of the stored image. Subsequently, the image feature extraction module 2 can store each of the series of vectors in a corresponding feature vector list 7, provided image storage manager module 11, described in detail below, authorizes storage of the particular feature vectors associated with incoming image being considered for entry into system 1.

The second module forming CBIR system 1, an indexing tree module 3, can generate a series of hierarchical search trees to generate an hierarchical search/indexing tree 6, each binary search hierarchical search tree corresponding to a particular characteristic of an image stored in storage medium 9. Specifically, the indexing module 3 can read a vector of numerical descriptors contained in a particular feature vector list 7, the vector corresponding to an image stored in storage medium 9. Subsequently, preferably using an unsupervised clustering method, the indexing module 3 can create and insert a node containing the vector into a hierarchical search tree 6 keyed on the same image characteristic as the feature vector list 7. The indexing module 3 can perform the node insertion operation for each feature vector list 7 stored. Thus, each resulting hierarchical search tree 6 can provide for the rapid location of candidate imagery stored in storage medium 9, each hierarchical search tree 6 weighted to a particular image characteristic.

The third module forming CBIR system 1, a querying module 4, can accept a query image from a user and can return to the user, one or more similar images stored in storage medium 9. Specifically, the querying module 4 can perform an appropriate first level data reduction based upon the query image's associated vectors. Significantly, the image feature extraction module 2, using the query image as an input, can generate the associated feature vectors. Using the feature vector numerical descriptors as a guideline, a very rapid traversal of indexing tree 6 in the first-level data reduction routine can produce a preliminary selection of matching images stored in storage medium 9. Subsequently, a relevance feedback routine contained within the querying module 4 can receive input from the user to further focus the image search to the most relevant images. In particular, in a preferred embodiment the user can select several images contained in the preliminary selection of matching images, the selected images having similar characteristics to the query image.

Following the relevance feedback procedure, a second level data reduction can be performed using the relevance feedback. Once the system has produced a reduced set of image descriptions, each image can be combined to provide the user with a vastly reduced set of images having similar characteristics to the query image.

System 1 includes image storage manager module 11 according to the invention which is communicably connected between the image feature extraction module 2 and feature vector list 7. Image storage manager module 11 determines a visual similarity parameter based on a degree of visual similarity between feature vectors of an incoming image being considered for entry into database provided by image feature extraction module 2 to feature vectors associated with a nearest one of the stored images in storage medium 9 via comparison to feature vector list 7. Based on the visual similarity parameter value, it is determined whether to store, and if so, how long to store the feature vectors associated with an incoming image in feature vector list, preferably as well as the incoming image itself in storage medium 9.

The invention thus solves the problem of identifying and reducing redundancy in the image database based upon the application of a similarity metric. A similarity value can be determined by comparing the features of an incoming image to the existing features in feature vector list 7 in the sense of a Euclidean or L-norm distance, although any suitable similarity or theoretical comparison metric will generally work.

An image vector that is very similar to an existing vector (or more typically image vectors) in the database can either be rejected as redundant, or it can be tagged for deletion from the system 1 based on its similarity to existing data, e.g., an image and its associated feature vectors that is very similar could be tagged for removal from the system after a short time period, a relatively dissimilar image would be tagged for longer retention in the system. The invention thus provides several inventive aspects:

(1) A method for increasing information content in a large image library while maintaining or reducing the size of the data stored in the system;

(2) A method for reducing the required capacity of the database by selectively accepting only those records into the system having the highest relative levels of uniqueness according to a similarity-based redundancy metric.

(3) A method for dynamically determining the length of time that individual records are to be maintained in the system by tagging each individual record for lifetime retention according to a similarity-based redundancy metric.

(4) A system in which "information" is defined by the metadata associated with images that describe processes (e.g., such as manufacturing processes, medical or biological processes, chemical or pharmacological processes, etc.), while "similarity" is defined according to image content. Combining these two attributes of the data set together (i.e., information about processes and image content) represents a unique approach to CBIR data management. This process produces a more efficient data archive by maintaining the information content of the data records (expressed through image-based feature vectors) while reducing the need to retain redundant information. Since a retrieval of information from the image archive is limited by the quantity of material that can be displayed to and consumed by a user, this method results in a display of information that is reduced in redundancy and thus more readily comprehended and consumed by the user. The process also results in higher performance of the system by reducing the volume of data that needs to be indexed and retained, therefore allowing the system to contain a wider variety of data (increased information content) and to perform indexing and retrieval processes in a reduced amount of time.

To further clarify the invention, a typical image feature description process and the associated indexing process are reviewed. The goal of indexing and the concept of an image indexing tree 6 is to organize the image features in the database such that a ranked list of nearest neighbors can be retrieved without performing an exhaustive comparison with all the records in the database. For a feature-based CBIR system, such as system 1 shown in FIG. 1, this is generally achieved by generating a binary decision tree of the image features. A bin is defined as a bottom-level element in the tree structure, sometimes described as a "leaf" or "terminal node", that contains a small list of images, e.g., a bottom-level bin may contain a list of image vectors $\{v_a, v_b, v_c, \ldots\}$.

Under this CBIR architecture, a query vector from querying module 4 is compared at the top level to each of two sub-nodes and a decision is made as to which sub-tree in indexing tree 6 to take. There are many ways to implement decision trees. For the present invention an approximate nearest neighbor (ANN) indexing and search method that builds on kd-tree methods has been selected for implementation. Whereas an exhaustive nearest-neighbor search of the n vectors (i.e., images) in the database would be of O(n) computations, the kd-tree approach is reduced to O(log(n)).

CBIR technology has been demonstrated through field-testing in the semiconductor industry to provide the end-user with an efficient method for organizing pre-existing repositories of images and extracting useful information about historical process conditions that can be used to address current process issues, such as yield related issues. The present invention provides a method of data management and intelligent data storage to minimize the number of data samples that must reside in the DMS while adequately representing the manufacturing process for future problem solving. Due to the rapid growth in the size of the fab image database and the high potential for redundancy, this method has been designed to achieve a reduction in redundancy that facilitates either, (1) the long-term storage of the most information-rich image content (i.e., maintaining the same database capacity but keeping data for a longer period of time), or (2) a reduction in the size of the repository capacity which results in improved performance (i.e., storage and retrieval efficiency) and reduced time for re-indexing. Based on these two criteria, an image data management method should address the mitigation or elimination of redundant data in the database, it should limit the number of entries to be maintained by the CBIR indexing structure, and each entry should be identifiable according to a duration or lifetime for maintenance in the system based on a measure of redundancy.

Figure 2:
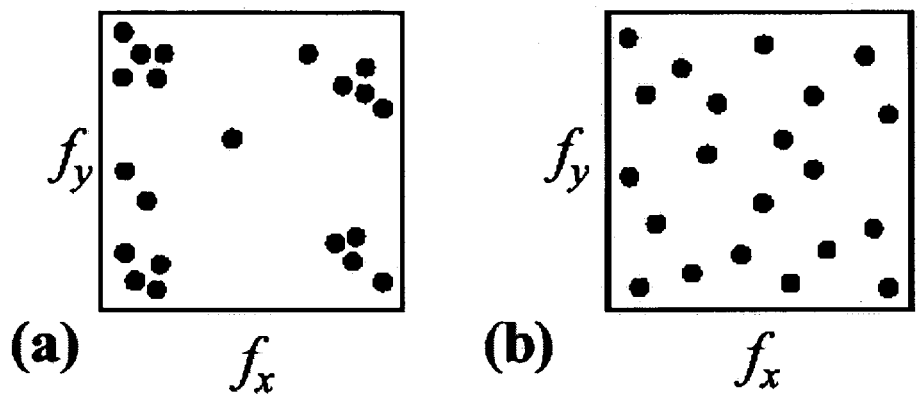
FIG. 2 is a simplified representation of the CBIR feature-space for two dimensions showing an advantageous high information scenario in (b) and a disadvantageous low information scenario in (a) for a given database size.

FIG. 2 schematically represents an approach to data reduction in a CBIR system having an image storage manager module 11 according to the invention. As data is stored in the CBIR database, represented in a simplified sense as a feature point, or a dot in FIG. 2, it creates a non-uniform distribution. Because of the large number of redundant images that are placed in the system due to modern sampling strategies, a scenario such as that shown in FIG. 2(*a*) often occurs. According to this figure data is grouped redundantly around cluster points and limited by the capacity of the database, represented by the empty space between clusters. As a result, the area where new process information could be encapsulated, is never filled. The goal, therefore, is to achieve a uniform distribution of data points to fill the feature space as shown in FIG. 2(*b*).

The method according to the invention achieves this goal by testing an image before being added to the database for visual similarity to its nearest neighbor that already resides in the database. For the sake of simplicity, the image is assumed to be represented by a single point. A submission data point, denoted Q for the description below, that has high similarity to its nearest neighbor is considered redundant, whereas a submission data point of low relative similarity to its nearest neighbor is considered unique. In this simplest single threshold case, if the similarity is less than a threshold value, e.g., $d_{thresh} > \|Q - v_i\|$, for $v_i$ the i-th nearest neighbor to Q, then the data point is assumed redundant and is subsequently rejected, and if greater than the threshold value the image is stored in the database.

This similarity based rejection method according to the invention can be extended to consider a plurality of threshold values, such as two, three, four, or more separate thresholds that accommodate the identification of images for demarcating the duration for storage lifetime in the database. For a two (2) threshold method, the sorting can mathematically can be represented as follows:

$0 < \|Q - v_i\| \leq d_0$, short-term storage (highest redundancy), $d_0 < \|Q - v_i\| < d_1$, medium-term storage, and, $\|Q - v_i\| \geq d_1$, long-term (lowest redundancy), where $0 < d_0 < d_1 < 1$ are threshold values defined based on user needs.

One benefit of the invention is its ability to increase the quantity of information (i.e., versus raw data) that is maintained in a large image database library. This becomes critical for data intensive applications where very large image repositories are developed over time and where the historical representation of this image data is valued for its ability to provide useful information about current and future manufacturing, biomedical, medical, or pharmacological issues.

Commercial applications for the management of image content redundancy according to the invention includes any manufacturing environment that collects image-based data in a multitude of modes from inspection and review tools and equipment. This includes environments including, but not limited to, semiconductor wafer and integrated circuit manufacturing, paper formation and production, steel and aluminum production; glass production, printed graphics; and woven and non-woven textile manufacturing. While these environments are prime candidates for the technology due to the high likelihood of generating multiple samples of various categories of manufactured anomalies or defects, other industries could benefit as well. In the biological or medical fields, images of cellular data, small animal (e.g., mouse models), and human patient data in both preclinical and clinical environments also contain redundancies. If these image repositories are large and space limited, and if they are eventually used for diagnosing the effects of drug delivery, gene expression, disease states, etc., then methods according to the invention could prove quite useful as well.

EXAMPLES

It should be understood that the Examples described below are provided for illustrative purposes only and do not in any way define the scope of the invention.

Testing of the invention was performed using both a simulated image data set with known statistics, and with a data set extracted from the field test data described above. Regarding the simulated data, a set of random feature vectors were generated as Gaussian clusters in feature space. The selected parameters included: (1) the number of samples (i.e., feature vectors) in the dataset; (2) the number of samples held out for k-NN testing; (3) the number of defined features per vector; (4) the number of defined classes (i.e., clusters); (5) the class parameters including the class mean and standard deviation for each feature, and; (6) the size of the initial dataset to seed for the experiment. Exemplary results obtained for a dataset similar to the CBIR field test data is shown in FIG. 3.

Figure 3:
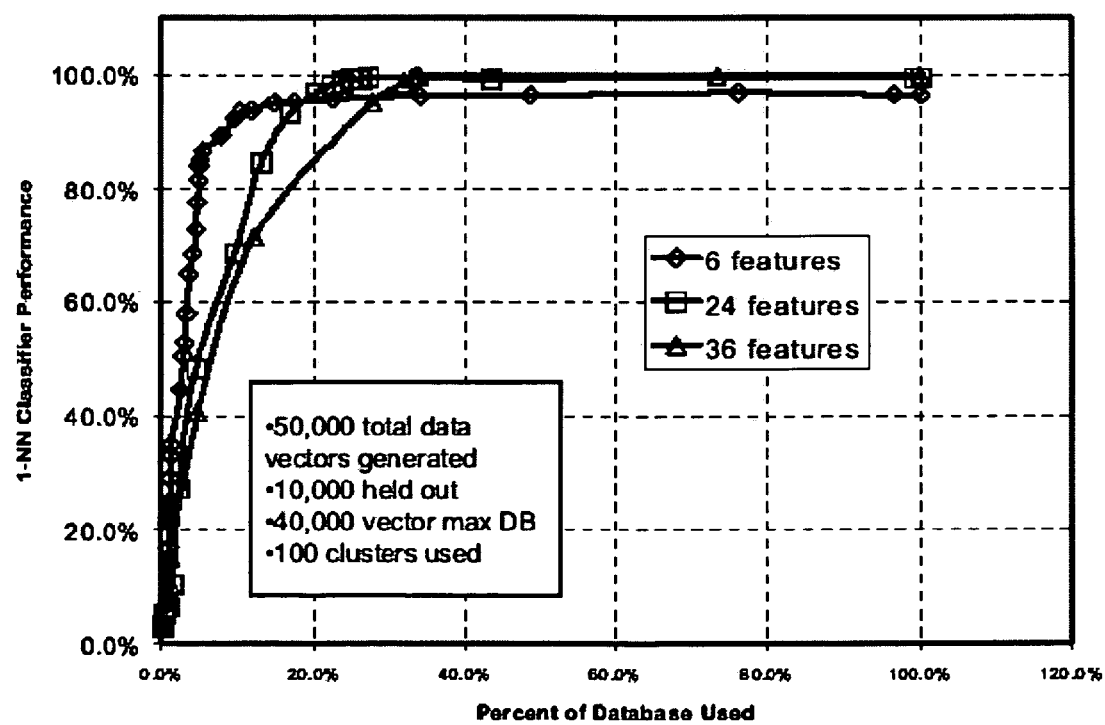
FIG. 3 is an Example showing data management results for a simulated dataset of 50,000 points. Note for the most complex case with 36 features per point that only 37% of the database is required to be maintained to capture greater than 90% of the information content of the original dataset.

FIG. 3 shows three curves that were generated for the test cases using 6, 24, and 36 length feature vectors respectively. The size of the dataset was 50,000 data points (i.e., feature vectors), with 100 defined clusters. This case was deemed similar to the type of environment generally encountered during field-testing in the semiconductor manufacturing environment and the environment that will be encountered in typical future field applications for the invention. The x-axis in this figure represents the fraction of the database that was required to achieve the indicated 1-nearest neighbor (1-NN) classification performance indicated on the y-axis. Note that the CBIR system is not a classification system but that a measure of the system's ability to locate visually similar content can be tested using a classifier paradigm. Note that for the most complex case, 100 clusters and 36 features per point, the system only required 37% of the original data points to capture greater than 90% of the information content of the original dataset. This data thus verifies the assumptions made regarding the mitigation of redundancy in the database for a parametrically controlled simulation using the method according to the invention, specifically the data generated and used in FIG. 3.

The inventive approach was verified by applying the same methodology to the field test data mentioned above. In this situation the number of clusters, or classes, was defined by the category of the data. For this test semiconductor wafer lot identification numbers (1,350 clusters) was used, the layer identification numbers (99 clusters), and the optical classification codes (144 clusters). A plot of these results showing normalized 4-NN performance is shown in FIG. 4.

Figure 4:
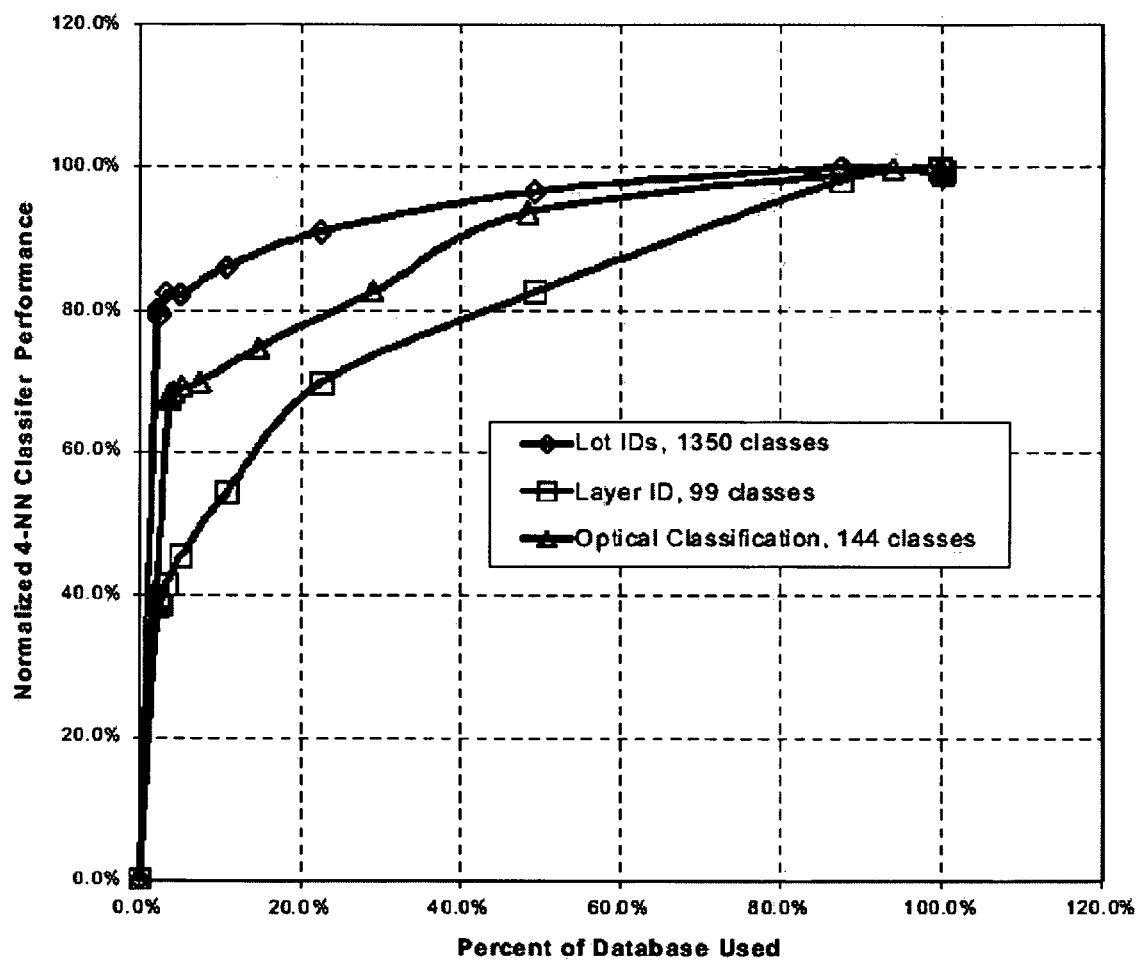
FIG. 4 is an Example showing data management results for actual semiconductor fabrication data collected during field-testing. Note the similar trend in the reduction of the number of data points required to adequately represent the manufacturing process.

In FIG. 4, a similar trend in the data curves as that of the simulated data shown in FIG. 3 is observed. An interesting point of note regards the case of using Lot ID as the 4-NN classification parameter. In this case there are 1,350 separate classes of lots that reside in the dataset. To achieve 90% performance of the system it is only required that approximately 30% of the original database be maintained for indexing and retrieval. The result is either a broader representation of the manufacturing data in the database for the same available capacity, or a reduction in the amount of capacity that must be maintained in the database system. Regardless of the result, this data management approach according to the invention represents the first available in a manufacturing environment to estimate the redundancy in the continuous stream of data being captured by the system by imposing meaningful reductions on the number of stored images based on visual similarity of images.

It is to be understood that while the invention has been described in conjunction with the preferred specific embodiments thereof, that the foregoing description as well as the examples which follow are intended to illustrate and not limit the scope of the invention. Other aspects, advantages and modifications within the scope of the invention will be apparent to those skilled in the art to which the invention pertains.

We claim:

1. A method of increasing information content for content-based image retrieval (CBIR) systems, comprising the steps of:

providing a CBIR database, said database comprising an index for a plurality of stored digital images using a plurality of feature vectors, said feature vectors corresponding to distinct descriptive characteristics of said images, said characteristics comprising defects of said images, anomalies of said images, or both;

calculating a visual similarity parameter value based on a degree of visual similarity between features vectors of an incoming image being considered for entry into said database and feature vectors associated with a most similar of said stored images;

determining whether to store said feature vectors associated with said incoming image in said database based on said visual similarity parameter value;

when said incoming image and said feature vectors associated with said incoming image are stored in said database, determining for at least one among said incoming image and one or more associated feature vectors a storage lifetime based on said visual similarity parameter value, the storage lifetime indicating when the at least one among said incoming image and one or more associated feature vectors is deleted from said database; and maintaining said CBIR database by deleting stored digital images from said CBIR database based on said storage lifetime associated with said stored digital image, wherein if said visual similarity parameter value of said incoming image is less than or equal to a first threshold value, assigning a short-term value to said storage lifetime associated with said incoming image;

wherein if said visual similarity parameter value of said incoming image is greater than or equal to a second threshold value, assigning a long-term value to said storage lifetime associated with said incoming image; and wherein if said visual similarity parameter value of said incoming image is between said first threshold value and said second threshold value, assigning an intermediate-term value to said storage lifetime associated with said incoming image, wherein said second threshold value is greater than said first threshold value.

2. The method of claim 1, wherein said visual similarity parameter is based on a distance or a divergence and wherein the distinct descriptive characteristics of said images comprise background characteristics.

3. The method of claim 1, wherein said similarity parameter comprises a Euclidean, L-norm, Mahalanobis or quadradic form distance, Minkowski-form distance.

4. The method of claim 1, wherein said similarity parameter comprises a Kullback-Leiber or Jeffrey divergence.

5. The method of claim 1, further comprising the step of defining a threshold value, wherein: if said visual similarity parameter value is above said threshold value said feature vectors associated with said incoming image is denied entry into said database, and if said similarity parameter value is less than said threshold said feature vectors associated with said incoming image is entered into said database.

6. The method of claim 1, further comprising the step of defining a plurality of threshold values, wherein said plurality of threshold values are used to define ranges of said similarity parameter values which are paired with durations for storage lifetimes in said database for said feature vectors associated with incoming image.

7. The method of claim 1, wherein said images are in-process manufacturing images or in-process images from an on-going preclinical or clinical study involving a plurality of patients in a biological or medical environment.

8. The method of claim 7, wherein said in-process manufacturing images are biological, medical or semiconductor images.

9. The method of claim 1, further comprising the step of indexing said plurality of feature vectors derived from said images using an image clustering method to produce a hierarchical search tree for indexing said plurality of feature vectors.

10. The method of claim 9, wherein said image clustering method comprises an unsupervised clustering method.

11. The method of claim 9, wherein said image clustering method maps said plurality of said feature vectors associated with said images into a set of groups based on similar image content, with the number of groups numbering less than the number of said images.

12. The method of claim 1, wherein said database includes stored information describing specific processes or process steps associated with each of said images.

13. The method of claim 1, further comprising determining the feature vectors based on the distinct descriptive characteristics of an image.

14. A content-based image retrieval (CBIR) system, comprising:
at least one processor for extracting a plurality of feature vectors from a digital image, said feature vectors corresponding to particular descriptive characteristics of said image,
the processor for implementing a clustering method to index said feature vectors into a hierarchical search tree;
a database storing said feature vectors associated with a plurality of said digital images communicably coupled to an image storage manager module, said image storage module identifying a visual similarity parameter value based on a degree of visual similarity between features vectors of an incoming digital image being considered for entry into said database and feature vectors of a most similar of said plurality of said digital images, and determining whether to store said incoming said feature vectors associated with said incoming image in said database based on said visual similarity parameter value; and
wherein the processor retrieves at least one of said stored images, said processor for retrieving at least on image having feature vectors comparably related to said feature vectors associated with said query image
wherein the processor determines for at least one among said incoming image and one or more associated feature vectors a storage lifetime based on said visual similarity parameter value when said incoming image and said feature vectors associated with said incoming image are stored in said database, the storage lifetime indicating when the at least one among said incoming image and one or more associated feature vectors is deleted from said database, wherein the processor maintains said database by deleting stored digital images from said database based on said storage lifetime associated with said stored digital image,
wherein if said visual similarity parameter value of said incoming image is less than or equal to a first threshold value, said processor assigns said storage lifetime associated with said incoming image with a short-term value;
wherein if said visual similarity parameter value of said incoming image is greater than or equal to a second threshold value, said processor assigns said storage lifetime associated with said incoming image with a long-term value; and
wherein if said visual similarity parameter value of said incoming image is between said first threshold value and said second threshold value, said processor assigns said storage lifetime associated with said incoming image with an intermediate-term value, wherein said second threshold value is greater than said first threshold value.

15. The system of claim 14, wherein said image clustering comprises unsupervised clustering.

16. The system of claim 14, wherein the particular descriptive characteristics of said image comprise anomalies.

17. The system of claim 14, wherein the feature vectors corresponding to the particular descriptive characteristics are based on an image.

* * * * *